(12) United States Patent
Sarkar

(10) Patent No.: US 10,824,229 B2
(45) Date of Patent: Nov. 3, 2020

(54) SYSTEM AND METHOD FOR RESONANT EYE-TRACKING

(71) Applicant: AdHawk Microsystems, Kitchener (CA)

(72) Inventor: Niladri Sarkar, Waterloo (CA)

(73) Assignee: AdHawk Microsystems, Kitchener (CA)

( * ) Notice: Subject to any disclaimer, the term of this patent is extended or adjusted under 35 U.S.C. 154(b) by 16 days.

(21) Appl. No.: 15/876,148

(22) Filed: Jan. 20, 2018

(65) Prior Publication Data

US 2018/0210547 A1 Jul. 26, 2018

Related U.S. Application Data

(60) Provisional application No. 62/448,577, filed on Jan. 20, 2017.

(51) Int. Cl.
*G06F 3/01* (2006.01)
*G02B 26/10* (2006.01)
*G02B 27/00* (2006.01)
*G02B 26/08* (2006.01)
*G02B 27/01* (2006.01)

(52) U.S. Cl.
CPC ......... *G06F 3/013* (2013.01); *G02B 26/0833* (2013.01); *G02B 26/105* (2013.01); *G02B 27/0093* (2013.01); *G02B 27/0172* (2013.01); *G02B 27/0176* (2013.01); *G02B 2027/0178* (2013.01)

(58) Field of Classification Search
CPC . G06F 3/013; G02B 26/0833; G02B 27/0093; G02B 26/105; G02B 27/0172; G02B 27/0176; G02B 2027/0178
See application file for complete search history.

(56) References Cited

U.S. PATENT DOCUMENTS

| 5,638,176 | A | * | 6/1997 | Hobbs | G01B 11/26 356/484 |
|---|---|---|---|---|---|
| 7,388,699 | B1 | * | 6/2008 | Coffee | G02B 26/10 359/212.1 |
| 2002/0014579 | A1 | * | 2/2002 | Dunfield | G02B 26/0833 250/216 |
| 2004/0120023 | A1 | * | 6/2004 | Bush | G02B 26/0833 359/213.1 |
| 2007/0081241 | A1 | * | 4/2007 | Hayashi | G02B 26/0875 359/443 |
| 2013/0242364 | A1 | * | 9/2013 | Kilcher | G02B 26/0866 359/201.2 |
| 2015/0235355 | A1 | * | 8/2015 | Mullins | G02B 27/0172 345/633 |
| 2016/0240013 | A1 | * | 8/2016 | Spitzer | G06F 3/013 |
| 2017/0038253 | A1 | * | 2/2017 | Mallinson | G06F 3/011 |
| 2017/0115483 | A1 | * | 4/2017 | Aleem | G02B 27/0093 |
| 2017/0364732 | A1 | * | 12/2017 | Komogortsev | G02B 27/0093 |
| 2018/0189977 | A1 | * | 7/2018 | Zecchini | G01S 7/497 |

* cited by examiner

*Primary Examiner* — Stephen G Sherman
(74) *Attorney, Agent, or Firm* — Kaplan Breyer Schwarz, LLP

(57) ABSTRACT

Aspects of the present disclosure describe systems, methods, and structures that provide eye-tracking by 1) steering a beam of light through the effect of a microelectromechanical system (MEMS) operating at a resonant frequency onto a corneal surface; and 2) detecting the light reflected from the corneal surface.

16 Claims, 16 Drawing Sheets

SYSTEM AND METHOD FOR RESONANT EYE-TRACKING

CROSS REFERENCE TO RELATED APPLICATIONS

This application claims the benefit of United States Provisional Patent Application Ser. No. 62/448,577 filed 20 Jan. 2017 which is incorporated by reference as if set forth at length herein.

TECHNICAL FIELD

This disclosure relates generally to human—computer interfaces and more specifically to eye-tracking systems, methods and structures that advantageously provide real-time velocity measurements of saccades thereby enabling on-the-fly prediction of fixations.

BACKGROUND

As is known by those skilled in the art, the human eye may achieve angular velocities of 900°/sec during saccades—quick, simultaneous movement of both eyes between two or more phases of fixation in the same direction. Consequently, such saccades are among the fastest movement(s) performed by humans. Known further is that extraocular muscles—six muscles that control movement of the eye and one muscle that controls eyelid elevation—are precise enough to routinely generate microsaccades that routinely subtend angles from 0.03° to 2°. This combination of rapid and precise actuation serves as a "front-end" for the highest bandwidth sensory interface to the human brain namely, the visual system. Accordingly, future, human—computer interfaces are expected to take advantage of visual input mechanisms—resulting from a current trend in the emerging Virtual and Augmented Reality (VR/AR) enterprise.

Conventional eye tracking technologies are typically video-based image processing systems. Such systems are typically bulky (>1 cm$^3$), expensive (>$100. USD), power-hungry (>150 mW), and slow (~120 fps). As a result, they have not been broadly adopted in mobile or wearable technologies/systems. Notwithstanding, and while certain medical-grade systems may obtain 500 Hz tracking with 0.5° resolution, these systems are quite large (massive), may require head stabilization, and oftentimes are prohibitively expensive (>$50,000.00 USD). Compounding these drawbacks is the fact that the resolution of camera-based eye tracking systems is limited by deleterious effects related to pupil dilation and ringing in the transient response of the iris sphincter when excited by saccades.

Still further, and as will be readily appreciated by those skilled in the art, eye-tracking sensors must be improved significantly to provide seamless human-computer interaction (HCl) with connected devices in a mobile, wearable context. Of particular note, of the >50 commercial VR/AR headsets, there are few-to-none that provide un-tethered eye-tracking due—in part—to the high-power consumption and significant computational expense of video-based systems and methods.

Accordingly, systems, methods and structures that facilitate the development of low cost, precise eye tracking and further enable eye tracking by wireless devices including mobile devices would represent a welcome addition to the art.

SUMMARY

An advance in the art is made according to aspects of the present disclosure directed to systems, methods, and structures providing eye tracking that may advantageously facilitate a seamless, intuitive, non-invasive, interactive user interface between that user and smart devices including computers.

In a broad context, systems, methods, and structures according to the present disclosure provides eye-tracking by 1) steering a beam of light through the effect of a microelectromechanical system (MEMS) operating at a resonant frequency, onto a corneal surface; and 2) detecting the light reflected from the corneal surface.

In sharp contrast to the prior art, systems, methods, and structures according to the present disclosure operate the MEMS at a resonant frequency.

BRIEF DESCRIPTION OF THE DRAWING

A more complete understanding of the present disclosure may be realized by reference to the accompanying drawing in which:

FIG. 4(A) prototype glasses including frame, photodiode module and exploded view of: FIG. 4(B) scanner module for an eyeglass mounted eye tracking system according to aspects of the present disclosure;

FIG. 16(A) data captured while user's gaze is fixed on multiple points on a screen; and FIG. 16(B) calibration performed on inner points and post-calibration translated points according to aspects of the present disclosure;

Figure 1:
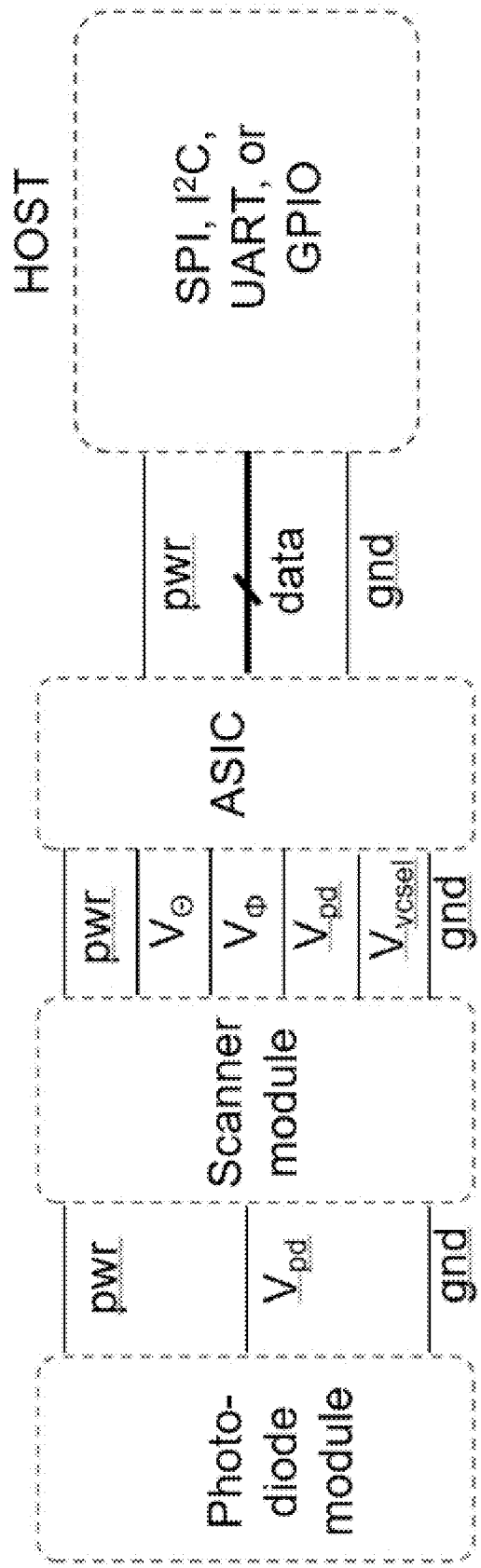
FIG. 1 is a schematic block diagram showing an illustrative eye tracking system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

FIG. 1 shows a schematic block diagram illustrating an eye tracking system according to aspects of the present disclosure. As will be apparent to those skilled in the art by inspection of this figure, such illustrative systems constructed according to aspects of the present disclosure exhibit substantial improvements in size, cost, power consumption, bandwidth and precision as compared with prior art eye-tracking systems.

With reference to that figure it may be observed that eye tracking systems according to the present disclosure generally include a photo-diode module, a scanner module, an application specific integrated circuit (ASIC) and a host computer or other controller. As illustrated, the ASIC is communicatively coupled to the scanner module via a number of signal lines namely, pwr, $V_\theta$, $V_\phi$, $V_{pd}$, $V_{vcsel}$, and gnd, which correspond to electrical power, driving voltages ($\theta$ $\phi$) for MEMS diffractive optic element, driving voltages for photodiode and vertical cavity surface emitting laser (VCSEL) and ground signals respectively. Note that for simplicity, individual elements comprising the module(s) are not specifically shown in this illustrative figure namely, MEMS, photodiode, VCSEL etc. Similarly, the scanner module is communicatively coupled to the photodiode module via pwr, gnd, and $V_{pd}$ signals. As we shall show and describe, the scanner module and photodiode modules are located and operated a physical distance apart from one another.

With continued reference to FIG. 1, there is shown the ASIC communicatively coupled to a host (i.e., computer system) via pwr, data, and gnd signals. Communications to/from such host may be illustratively accomplished via any of a number of known communications interfaces/protocols—where such interfaces comply with size/power budgets appropriate for systems/products employing eye tracking systems according to the present disclosure. Illustratively shown—but not limiting for the purposes of this disclosure—are communications interfaces/protocols including Serial Peripheral Interface bus (SPI), Inter-Integrated Circuit (I²C), Universal Asynchronous Receiver Transmitter (UART), and General Purpose Input Output (GPIO) bus(es).

Figure 2:
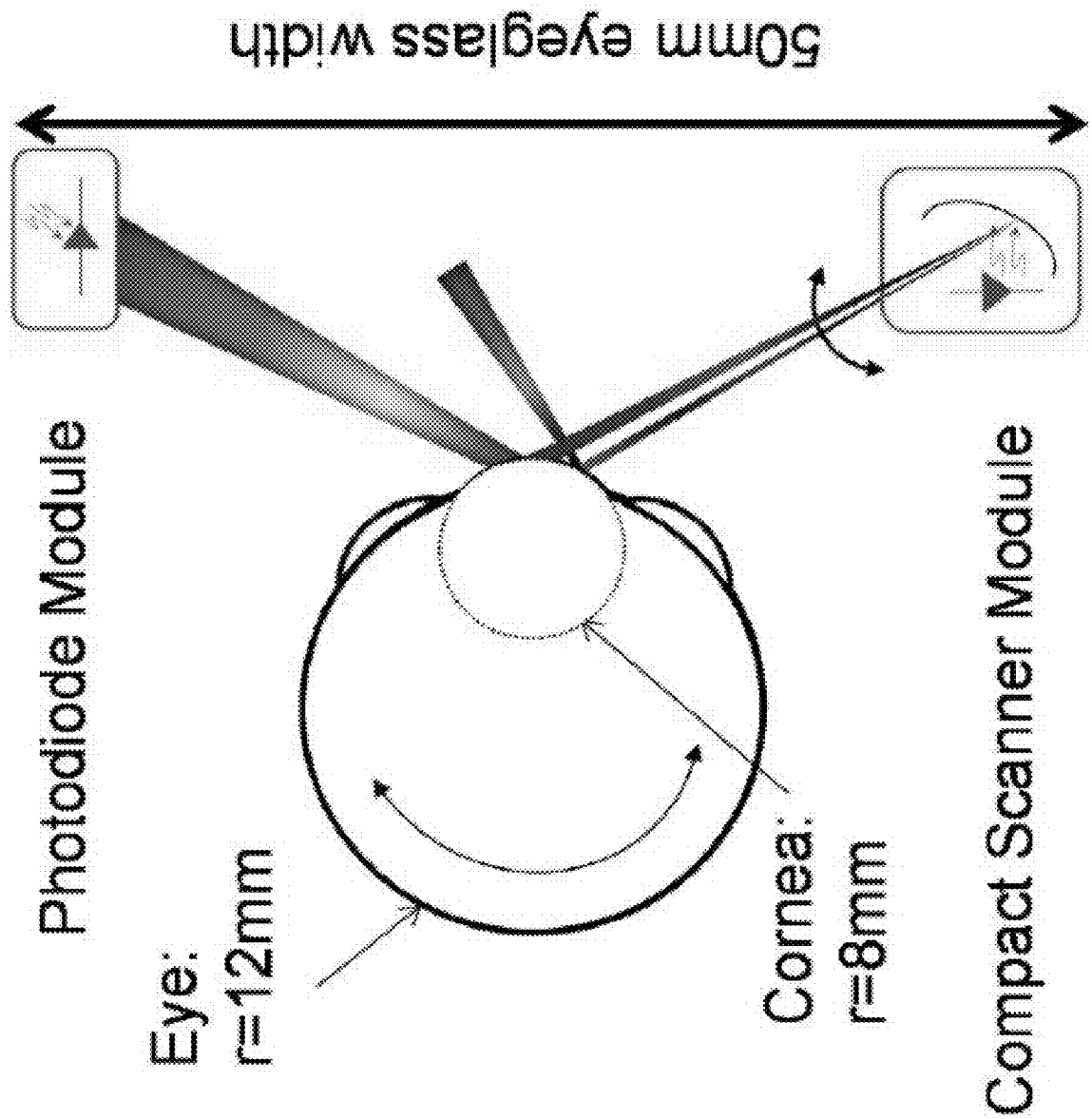
FIG. 2 is a schematic illustrating eye tracker system geometry and operation of an illustrative eye tracker of FIG. 1 including a micro-electromechanical system (MEMS) scanner module) according to aspects of the present disclosure.

Illustrative operational eye tracking geometry(ies) for the above-disclosed components are shown schematically in FIG. 2, which illustrates eye tracker system geometry(ies) for systems according to aspects of the present disclosure including a MEMS scanner that sweeps a beam of light across the cornea of an eye and a photodetector that receives the reflected beam.

As operatively illustrated in FIG. 2, a low-irradiance (i.e., 10-50 $\mu W/cm^2$) infrared (~850 nm) diverging (at ~50 mrad) beam of light is steered by a scanner and reflected from the surface of a cornea at a glancing angle (~60 degrees to the normal) onto a photodiode. Emphasizing simple design principles according to the present disclosure, the scanner is preferably fabricated from a micro-electromechanical system (MEMS) device and the light source and photodiode may be any of a variety known in the art.

Figure 3:
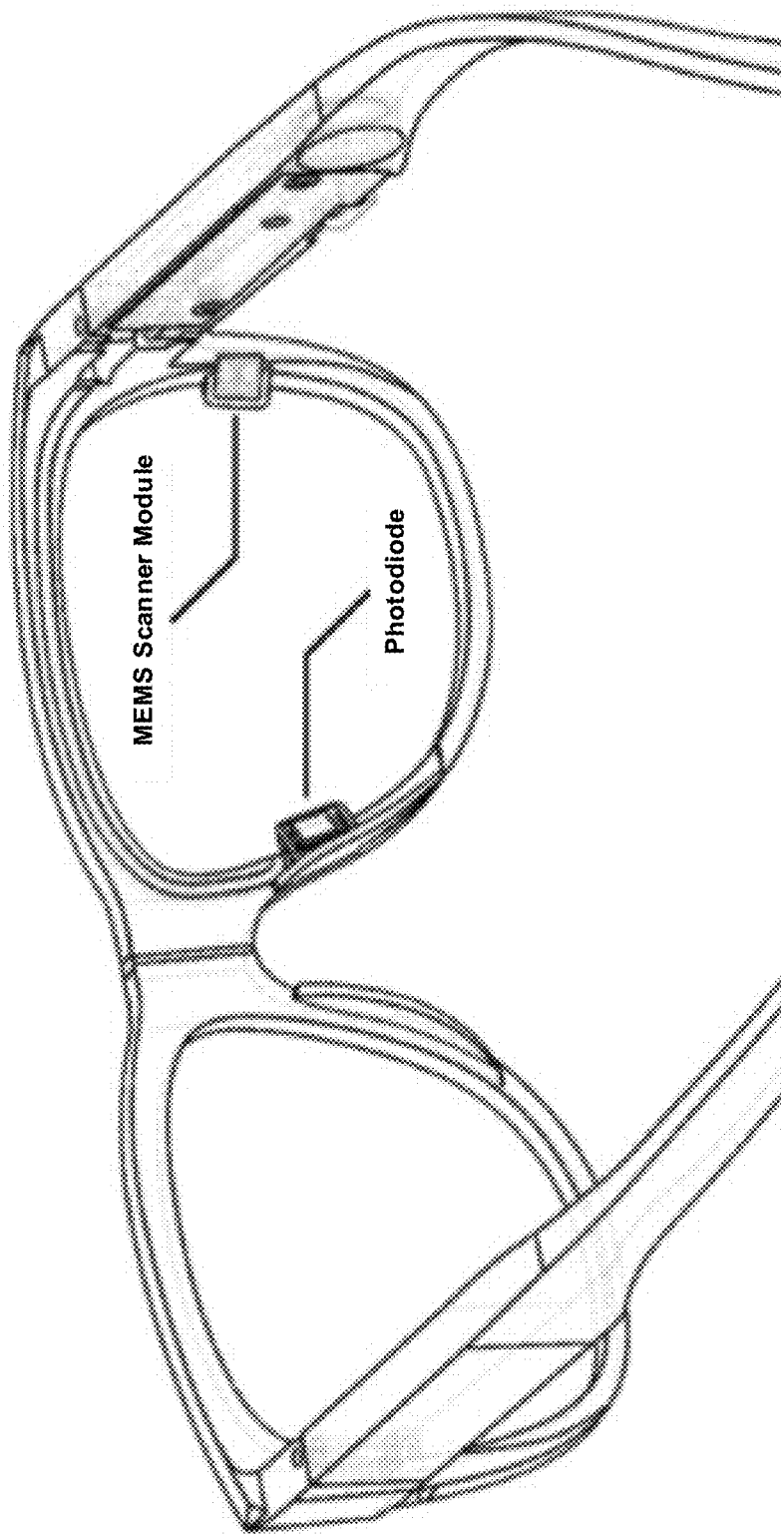
FIG. 3 is a schematic diagram showing an illustrative eye tracking system according to aspects of the present disclosure configured as part of a pair of eye glasses.
Figure 4:
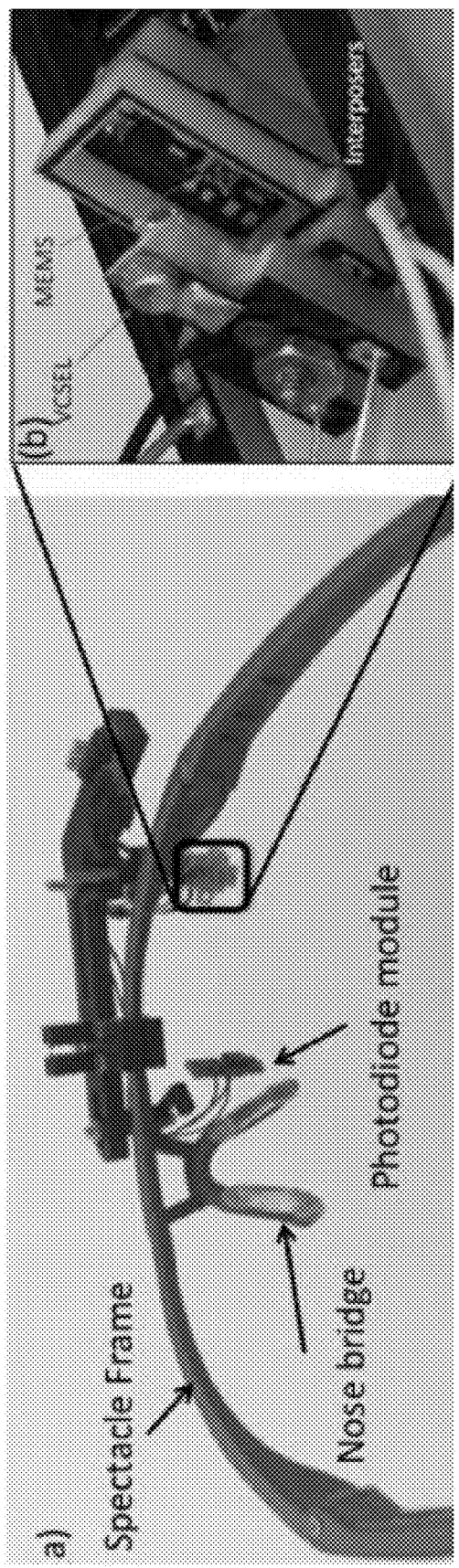
FIG. 4(A) and FIG. 4(B) show.

Operationally, as the eye rotates, a system according to aspects of the present disclosure tracks a unique point on the cornea that substantially maximizes a reflected light signal (reflected off the cornea) received by the photodiode. Notably, the surface area of the photodiode acts as a spatial filter to remove any high frequencies from the far-field pattern projected by the scanner. Advantageously, large aperture micromirrors having flat surfaces—while ideal for imaging systems—are not required for systems constructed according to the present disclosure. Instead, a small (~300 μm) Fresnel zone plate configured to project a pattern of high spatial frequencies may be employed. Illustrative glasses including an illustrative and prototype eye tracking system according to aspects of the present disclosure are shown in FIG. 3 and FIG. 4(A), respectively. An illustrative scanner module employed is shown in FIG. 4(B). While not explicitly shown in that figure, the scanner module employed includes a vertical cavity surface emitting laser (VCSEL) and the MEMS device.

Figure 5:
FIG. 5 shows a 2 degree-of-freedom scanning DOE according to aspects of the present disclosure.

As shown in FIG. 5, which shows a 2 degree-of-freedom (DOF) diffractive optic element (DOE), the MEMS devices employed in systems according to the present disclosure may incorporate Fresnel zone plates that are mounted on 2DOF scanners. The illustrative CMOS-MEMS scanner utilizes alternating bimorphs and rigid beams in a serpentine pattern to achieve large angular deflections. Before singulation of the die, the proximity of the substrate gives rise to squeeze film damping and intermittent contact with the diffractive optic element (DOE) when it is operated at resonance with large angles. The die is therefore singulated with the DOE suspended over its edge. As will be understood and appreciated by those skilled in the art, the natural frequency and offset of the fast-axis are temperature-dependent, so the slow-axis must be operated isothermally to suppress temperature excursions. Isothermal operation has been shown to mitigate thermal coupling in scanning probe microscopes that achieve 1 nm resolution in one axis over 20 μm displacements in the orthogonal axis.

The scanner design illustratively shown in FIG. 5 is isothermal in one axis only. In typical commercial applications, it must operate over large temperature ranges. Consequently, the offset position and resonant frequency may suffer from thermal drift resulting in the necessity to frequently calibrate systems employing same.

Figure 6:
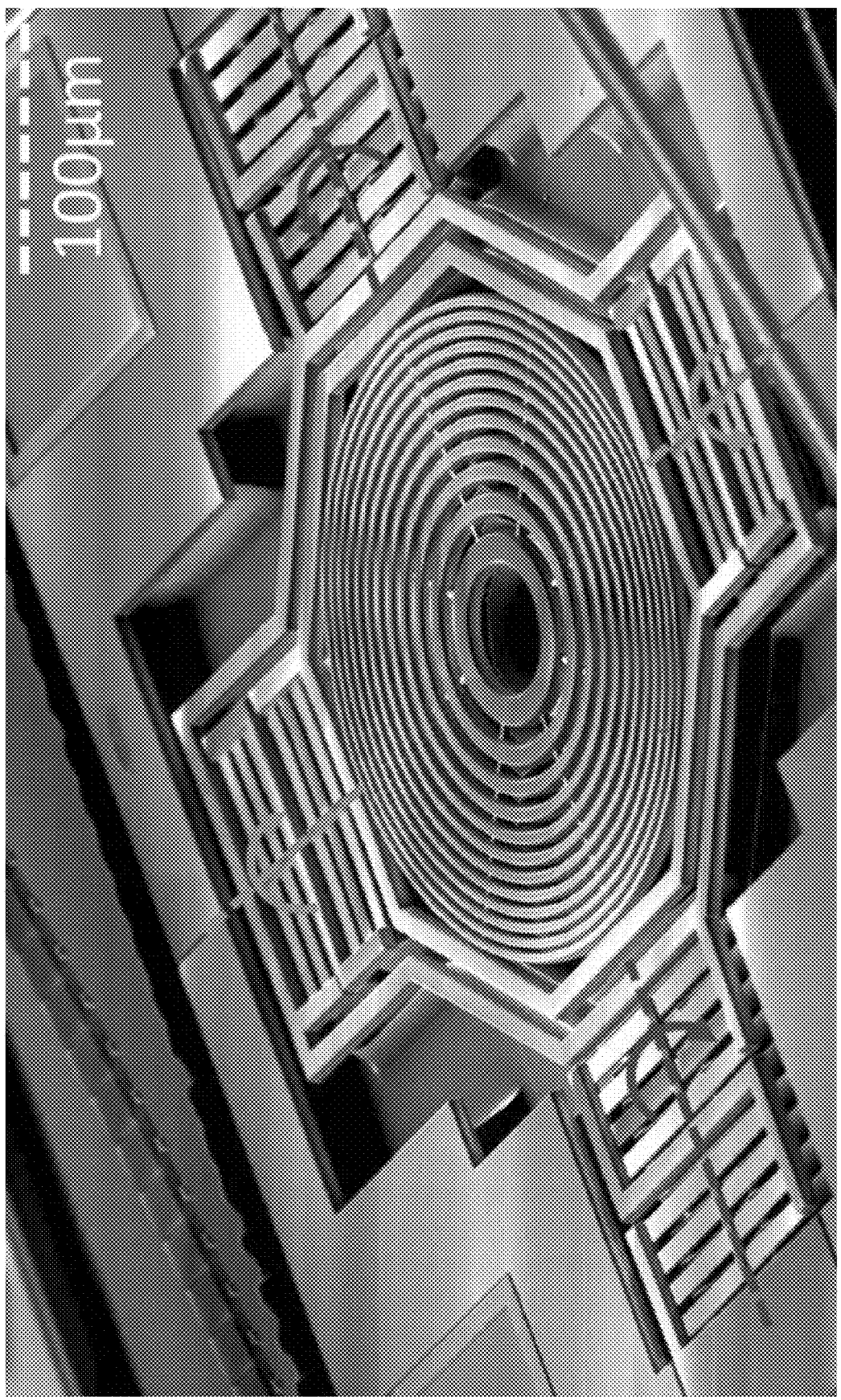
FIG. 6 shows a scanning DOE with 2 isothermal axes manufactured in a CMOS process in which CMOS-compatible voltages generate 90° (mechanical) deflections in both axis according to aspects of the present disclosure.

FIG. 6 shows a scanning diffractive optic element with 2 isothermal axes manufactured in a CMOS process. When applied to such a device, CMOS-compatible voltages generate 90° (mechanical) deflections in both axis. As may be observed from that figure, the scanner geometry includes opposed serpentine actuator pairs. Upon release, the device remains substantially flat due to the symmetrically opposed torques applied by each pair of actuators.

Operationally, to rotate the scanner reflector, the temperature of one actuator is increased, while the opposed actuator's temperature is decreased proportionally. Advantageously—with prototype devices—drifts in offset position of the device(s) were not observable upon external heating to a temperature of 100 degrees C. In addition, a design such as that illustrated in FIG. 6 may be operated with a single PWM channel per axis, further simplifying its operation in a commercial product/application.

At this point it is noted that the MEMs mechanical system exhibits a second order, resonant transfer function in response to an electrothermal stimulus. As such, the mechanical deflection responds with a phase lag to the electrothermal excitation. The phase lag well below the resonance frequency is close to 0, while the phase lag at resonance is 90°. As a result, there is a phase difference between the electrical signal driving the MEMS device, and the actual position of the MEMS device. This characteristic is exacerbated by the fact that there exists an additional phase delay due to the thermal time constant of the electrothermal actuators. In order to estimate the position of the scanner, one could use piezo-resistive detection, but this would add a complexity by increasing pad count of the device and requiring highly sensitive signal conditioning electronics.

Figure 8:
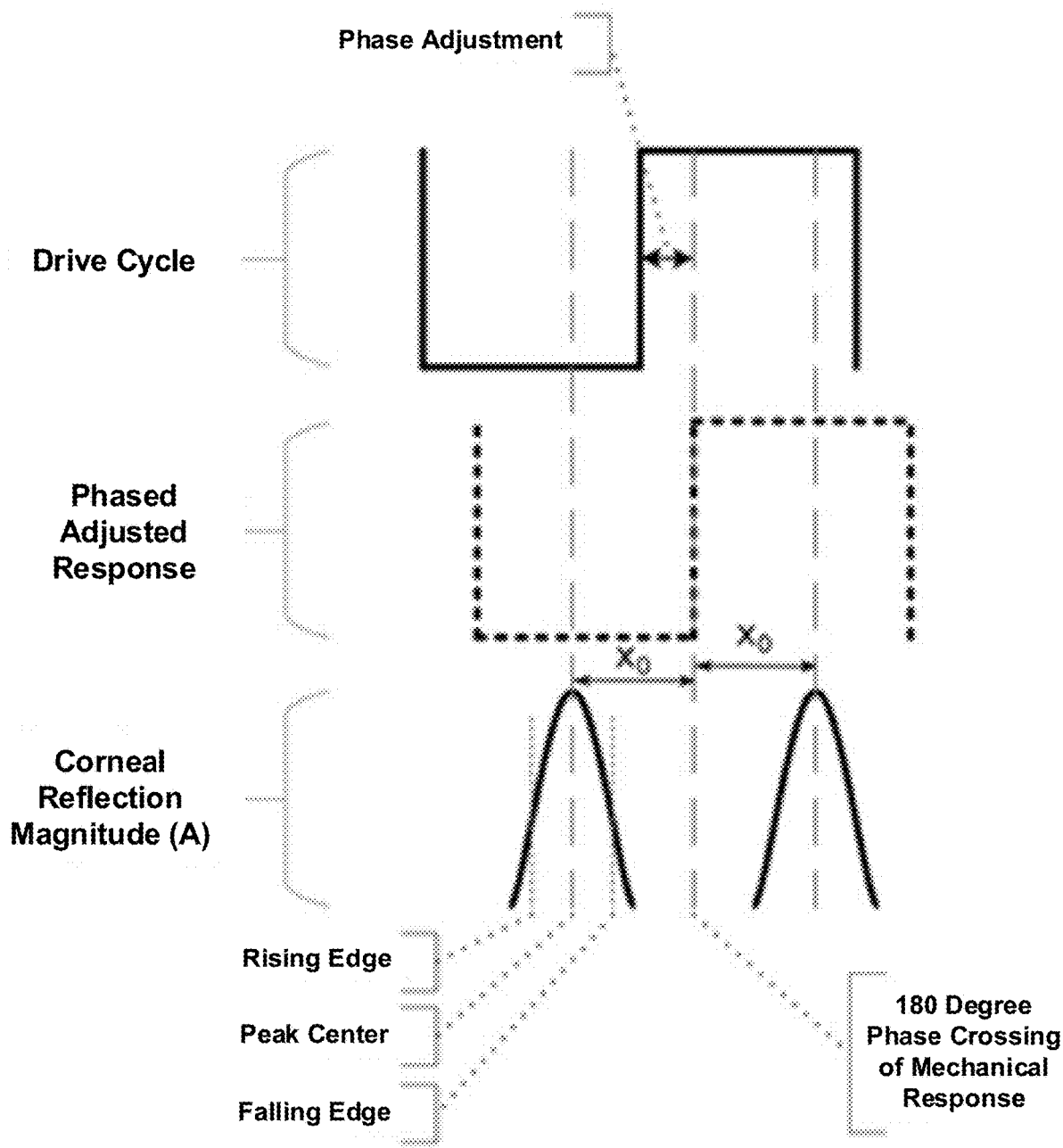
FIG. 8 shows a series of timing diagram plots illustrating scanning in phase lock/resonance based optical feedback according to aspects of the present disclosure.

As may be observed in FIG. 8, the specular reflection from a cornea results in two peaks per full cycle of the mirror fast axis—one in the forward direction and one in the negative (reverse) direction. Since the optical scan is symmetric in the forward and reverse direction(s), the mid-point of the centers of the two peaks correspond to the 180° phase crossing of the mechanical response. Regardless of the position of the eye, the timing of the pulses reveals the point in time at which the device is at it 180° phase crossing. Movement of the eye shifts the position of the peaks (XO) in a symmetrically opposed manner relative to the 180° phase crossing of the response waveform, thereby maintaining a constant midpoint.

By measuring the rising and falling edges of each peak, the center of each peak is determined, and the midpoint of each of these centers is subsequently determined thereby revealing the phase offset with respect to the driving signal. The system may then be advantageously tuned for a given phase offset with respect to the driving signal. The system may then be automatically tuned for a given phase offset or control to the phase adjustment with a servo loop to lock-in a prescribed phase adjustment of operation and/or to keep the system in resonance at 90° phase offset.

Figure 9:
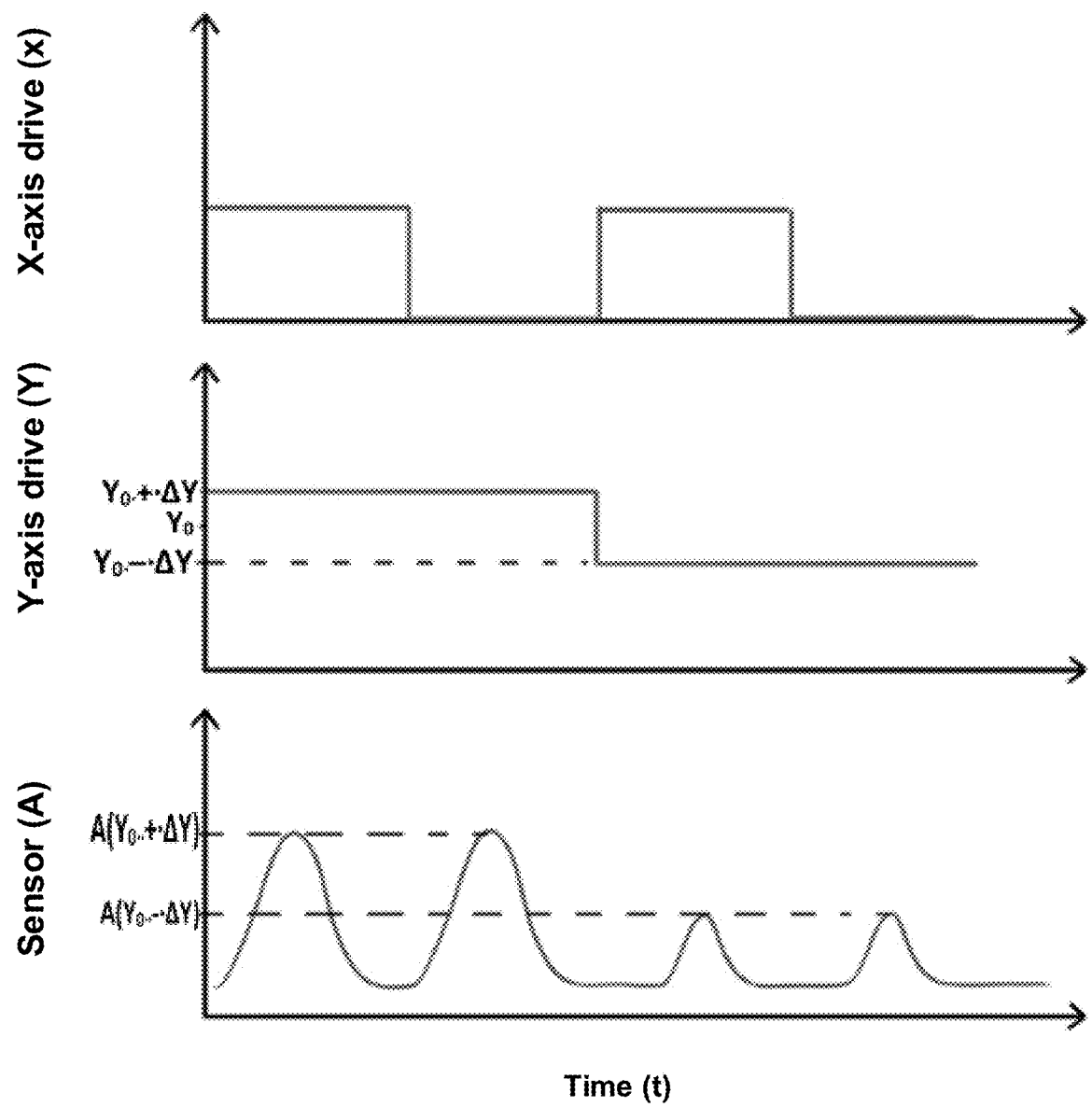
FIG. 9 shows a series of timing diagram plots illustrating two-line tracking/Lissajous according to aspects of the present disclosure.

FIG. 9 shows a series of timing diagrams for two-line tracking/Lissajous method(s) according to the present disclosure in which the x-axis drive (x), the y-axis drive (y), and the sensor (A), are all shown vs. time (t) for an illustrative system according to the present disclosure. In this illustrative case Y1 is a new position and Y0 is the current/previous position. One objective of such two-line tracking is to determine how to find a maximum peak-held detected magnitude A in a line scan to track eye position. As used in this context, a "line" is defined as a full period of the fast axis of the MEMS device.

Tracking in the vertical direction may advantageously be performed using two lines. Scanning one line with a positive offset y position offset of $+\Delta y$ and scanning a second line with a negative y position offset of $-\Delta y$ from the last reported position y0. If the peak magnitude $A(y0+\Delta y)$ measured in the $+\Delta y$ scan is greater than the peak magnitude measured in the $-\Delta y$ scan $A(y0-\Delta y)$ then the new position y1 should be incremented and vice versa if the magnitudes are reversed. A noised margin may advantageously be used such that if the delta between $|A(y0-\Delta y)-A(y0+\Delta y)|$ is below a threshold then no action is taken and y1 is maintained equal to y0.

Since we are actuating the fast axis at 2× the frequency of the slow axis we will have a scan response that resembles a Lissajous due to the low-pass response of the two axis MEMS scanner, i.e., the response of the MEMS device will exhibit sinusoidal characteristic in the X and Y directions (characteristic figure-8 shape/appearance).

Figure 7:
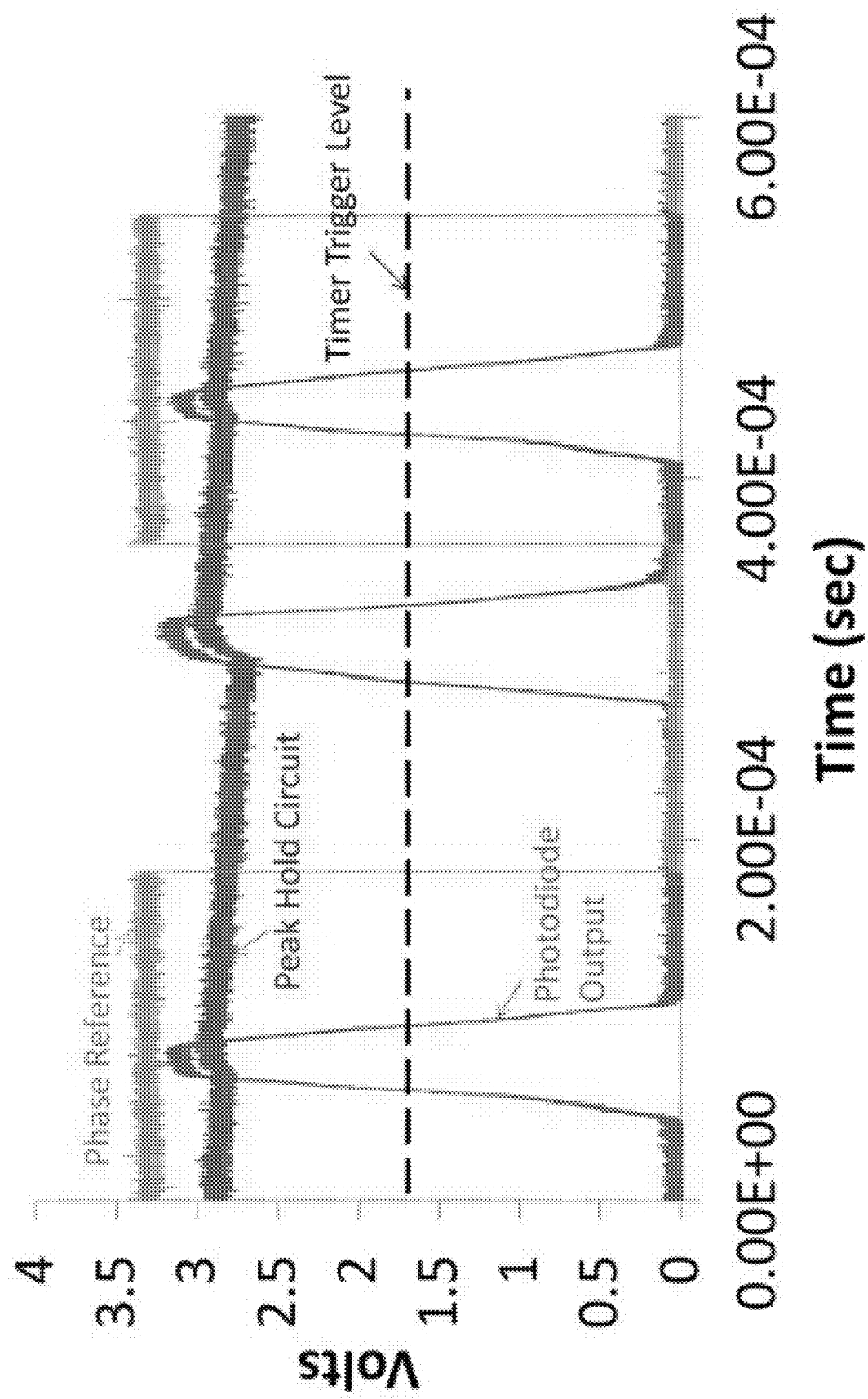
FIG. 7 shows captured oscilloscope traces illustrating the phase reference, photodiode output and peak-hold circuit output used to track vertical position according to aspects of the present disclosure.

Experimentally, the horizontal scan rate of a system according to the present disclosure is set to the resonant frequency of the fast-axis of the MEMS device which is substantially 3.3 kHz. Each oscillation cycle of the zone-plate produces 2 peaks in the photodiode output that correspond to the corneal reflections captured during the forward and reverse trajectories of the scanned beam as shown in FIG. 7 which shows an oscilloscope trace capture including phase reference, photodiode output, and peak-hold circuit output used to track vertical position. As may be observed from that figure, a square wave acts as the drive signal for a MEMS device and is also used to reset a timer in a microcontroller. When the photodiode signal exceeds a threshold, an edge-triggered interrupt captures the timer value and returns the horizontal position of the eye. The phase noise of this measurement translates to 0.4 degrees RMS noise in the lateral position of the eye.

Figure 10:
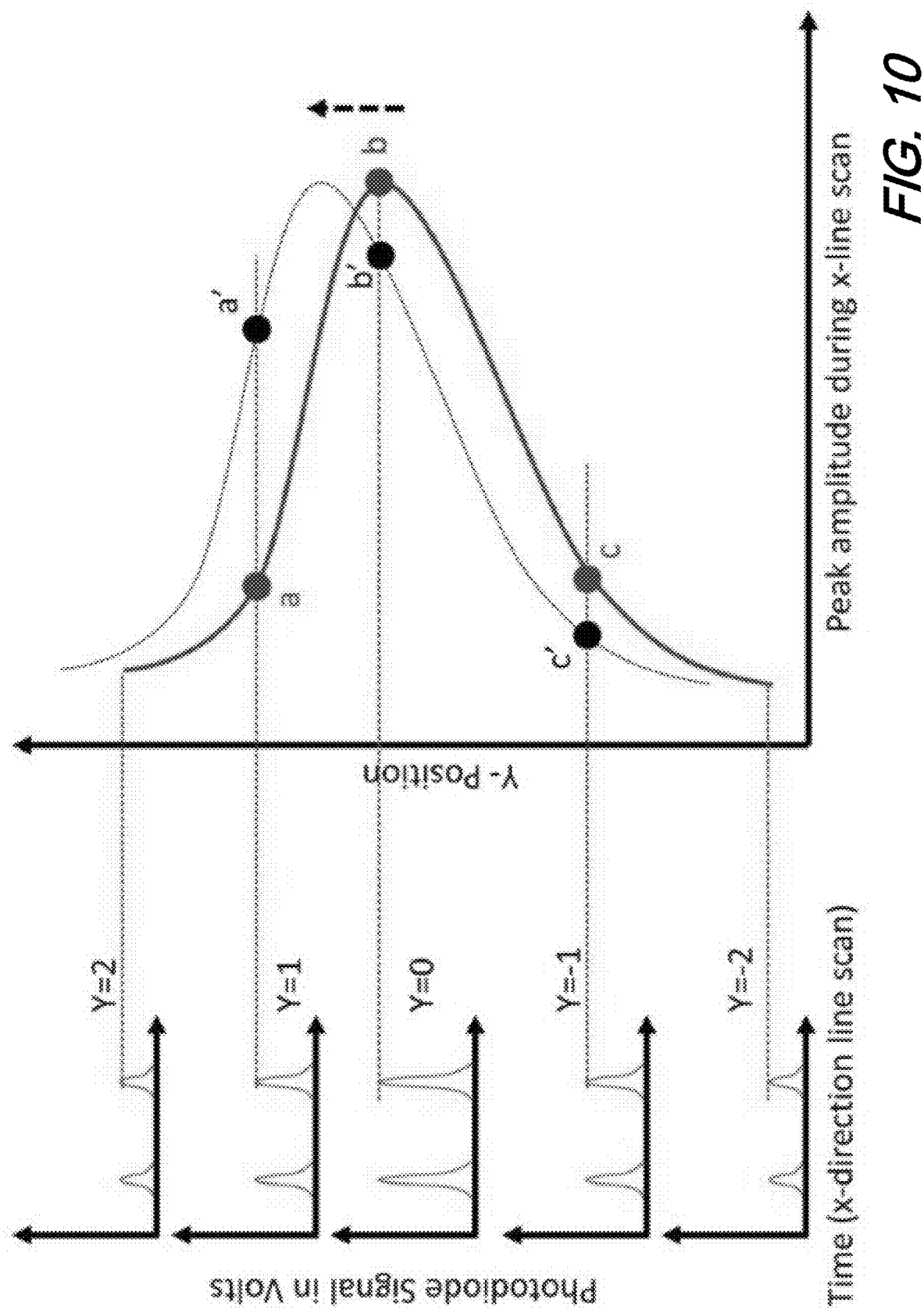
FIG. 10 shows a series of plots illustrating an envelope detected by a peak-hold circuit tracked at inflection points to reveal vertical position according to aspects of the present disclosure.

Note that a hill-climbing algorithm has been used to capture the vertical position (y-direction) of the eye. Since peak amplitude measurements from the photodiode signal are susceptible to noise from many sources, systems according to the present disclosure may obtain measurements at an inflection point of the vertical intensity profile as shown graphically in FIG. 10.

With reference to that figure, it is shown that an envelope detected by peak-hold circuit is tracked at inflection points to reveal vertical eye position. Because this is the highest-slope region in the photodiode's response, one obtains an improved signal-to-noise ratio (SNR) when tracking inflection points. Operationally, the algorithm scans three (3) lines near the global vertical maximum and sets the difference between the upper and lower measurements to zero to reveal the vertical position. The narrow beam profile of the corneal reflection in the vertical direction advantageously enables eye tracking within <1° resolution.

Figure 11:
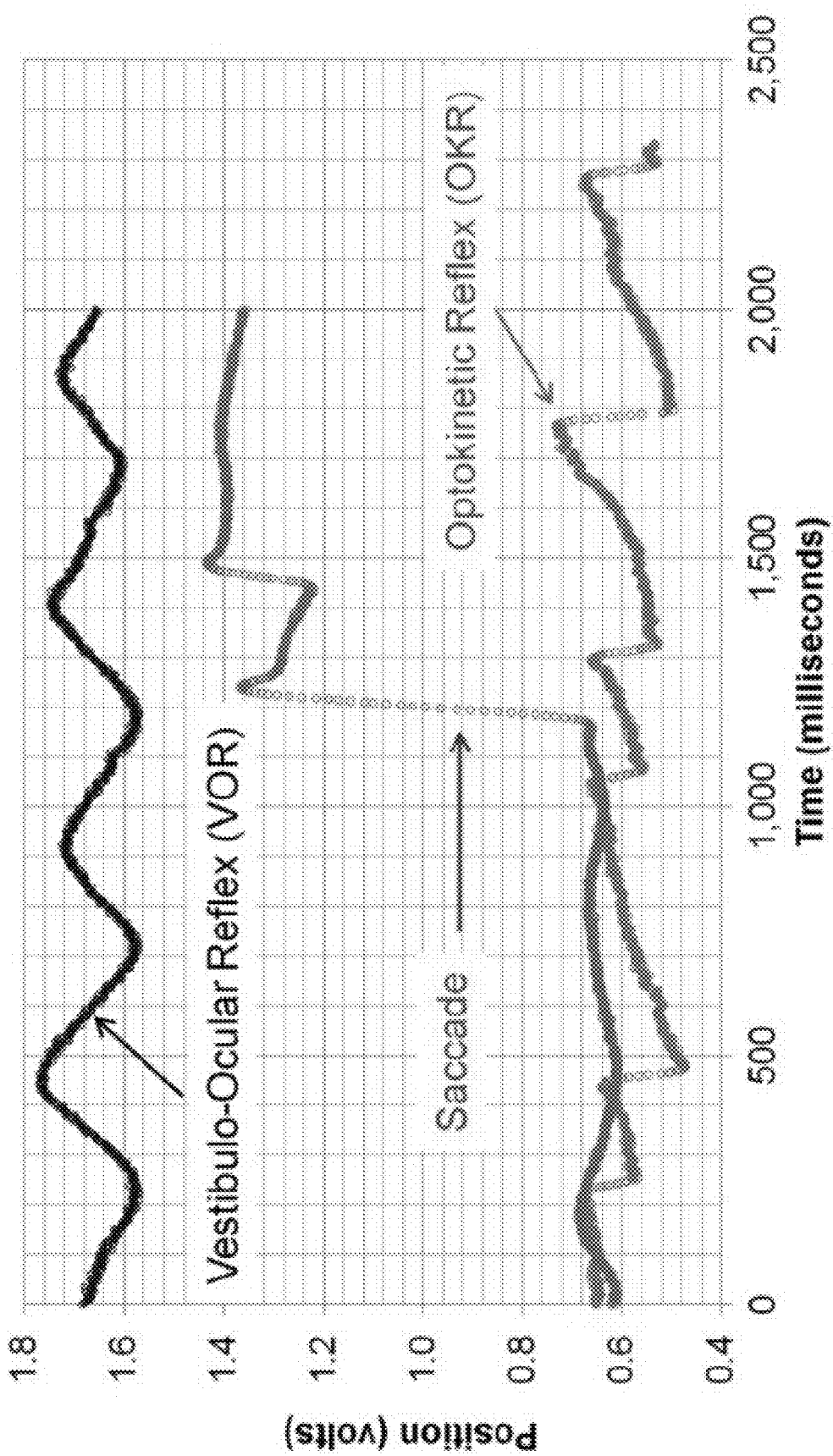
FIG. 11 shows a series of plots illustrating various eye movement patterns captured with sufficient bandwidth for velocity estimation by systems, methods and structures according to aspects of the present disclosure.

During evaluation, eye movements of several users were captured on systems constructed according to the present disclosure. In particular, vestibulo-ocular reflex (VOR) data was taken while a user set their gaze to a fixed point while rotating their head such that the eyes counter-rotated. With reference to FIG. 11 which shows plots of various eye movement patterns captured with sufficient bandwidth for velocity estimation, it may be observed that the VOR produces the smoothest eye movements, as evidenced by the absence of saccades.

As may be appreciated, if there is a mismatch between the VOR response and the position of the fixated object, the user may experience a disorientation and nausea. This scenario may occur in a VR context if head-tracking and image refresh rates are not accurate enough to compensate for a user's head movements. In fact, neural circuitry has been reported to adapt VOR gain upon prolonged exposure to such delays in VR, resulting in motion sickness upon re-entry to the real world. Accordingly, a system that constrains a position of a virtual object to the user's eye position within VOR movements may mitigate these effects.

A number of large saccades were also captured, by instructing a user to track a moving dot on a screen. The optokinetic reflex (OKR) was induced by translating a periodic pattern on the screen, producing alternating periods of smooth pursuit and saccades. The reported system samples the eye position with sufficient bandwidth to estimate velocity in real time—on-the fly.

Figure 12:
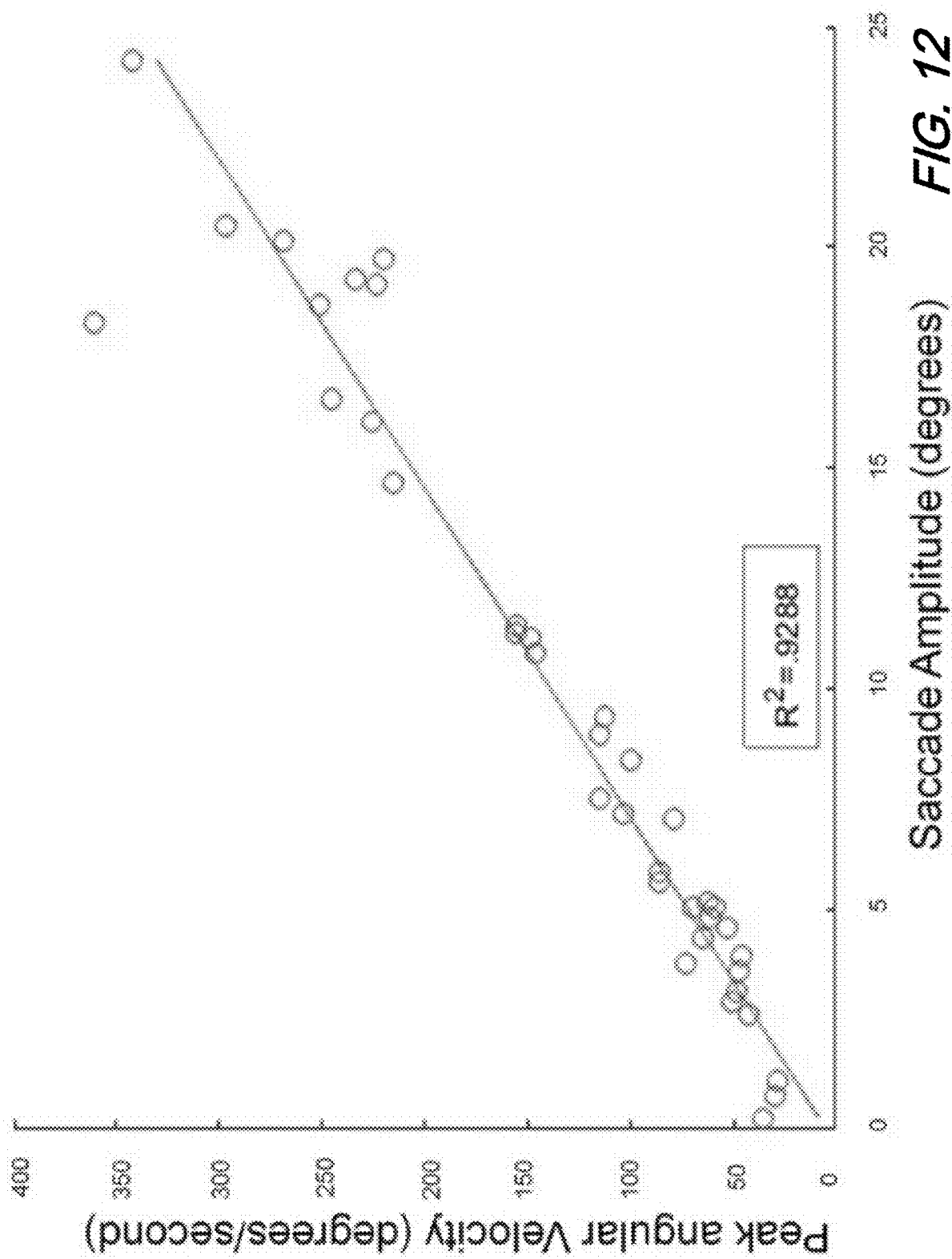
FIG. 12 is a plot illustrating saccade amplitude measured using systems, methods, and structures according to the present disclosure that is linearly related to the peak velocity within a saccade, indicating that the post-saccade position may be predicted when the eye begins to decelerate; according to further aspects of the present disclosure.

One important property of saccades is that their peak velocity is linearly related to their amplitude for movements up to ~20°, after which the velocity begins to plateau. This is particularly convenient for the purpose of endpoint prediction. Turning now to the plot shown in FIG. 12, it may be observed that saccade amplitude measured by systems according to the present disclosure is linearly related to the peak velocity within the saccade which may indicate that post-saccade position may be predicted when the eye begins to decelerate, approximately midway through a saccade. Stated alternatively, systems according to the present disclosure may measure velocity within saccades with sufficient resolution to predict the ensuing fixation, a feature that may dramatically reduce the power consumption of VR headsets through a technique known in the art as foveated rendering. One aspect of this is that vision is temporarily suspended (or at least high-pass filtered) while a saccade occurs (20-200 ms) and this may reduce the rendering burden in the display pipeline.

As may be appreciated by those skilled in the art, in a VR/AR environment, several additional constraints may influence the design of an eye tracking system according to the present disclosure. In particular, field-of-view (FOV) is emerging a key differentiator among headsets and may reach FOV values of 110° in the near future. Placement of the scanner and detector modules determines the usable range of an eye tracker.

Figure 13:
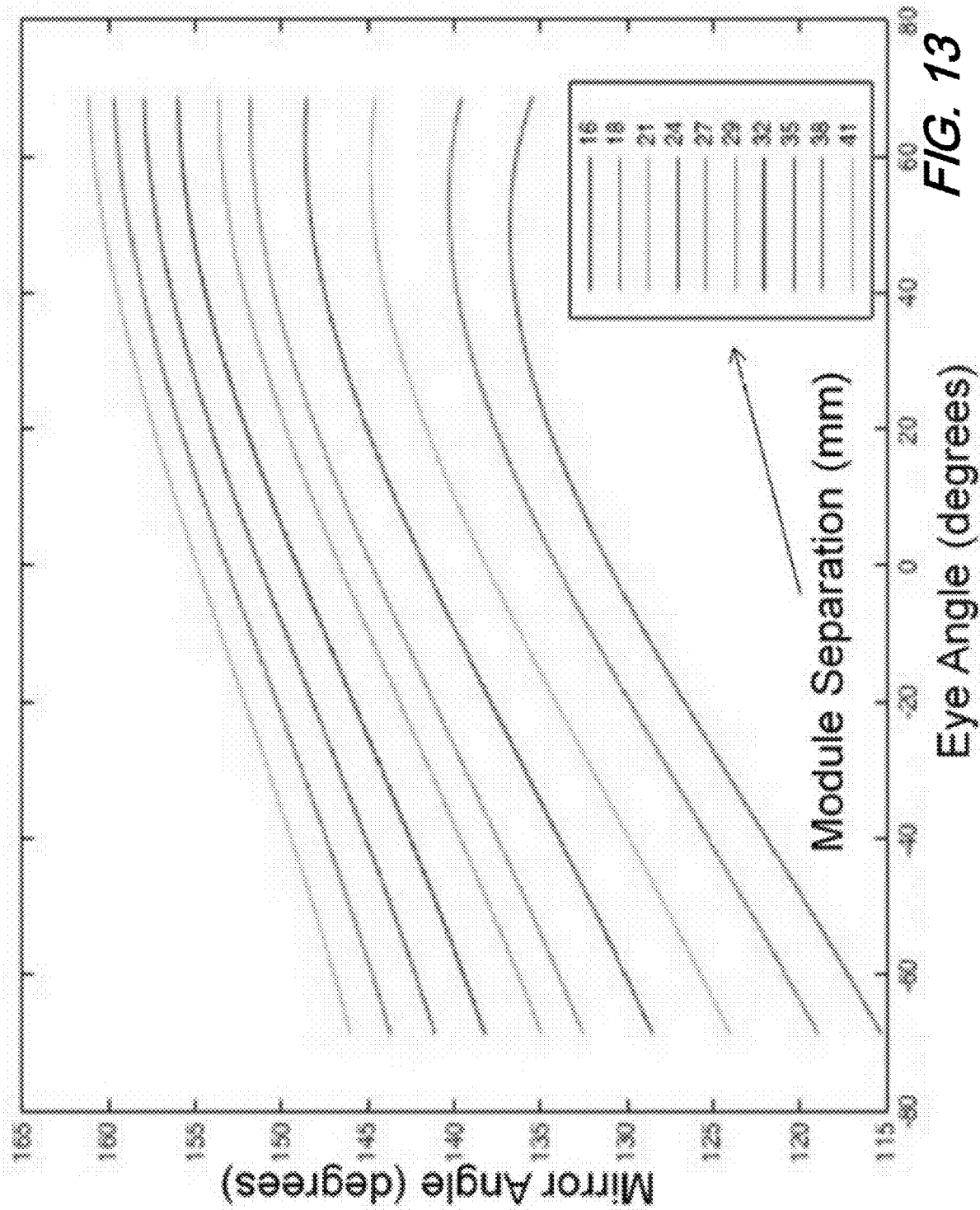
FIG. 13 is a series of plots of eye angle vs. mirror angle for various separations between scanner and photodiode modules according to aspects of the present disclosure.

FIG. 13 is a series of plots of eye angle vs. mirror angle for various separations between scanner and photodiode modules. The slope of the lines relates to the resolution of the system and ultimately constrains the tracking range. As my be observed, as the distance between modules is decreased, the usable range (where slope >0) increases at the expense of resolution (proportional to slope). Dual eye trackers may be employed to increase the effective tracking range of systems having a fixed-focal-length display. Alternatively, an intermediate reflector may be used to expand the so-called eye box while placing the module outside of a headset FOV.

Figure 14:
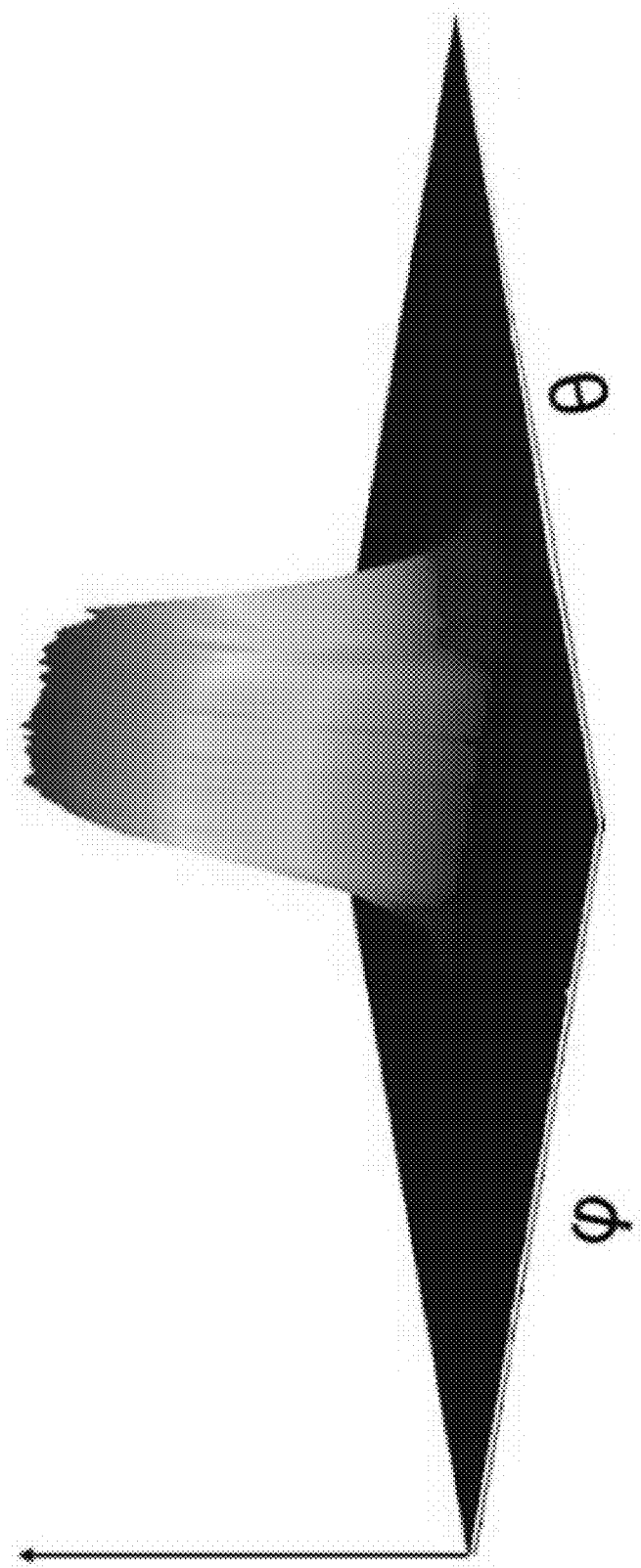
FIG. 14 is a plot illustrating an intensity profile of a corneal glint obtained by raster scanning a MEMS device according to aspects of the present disclosure.

FIG. 14 is a plot showing intensity profile of corneal glint obtained by raster scanning the MEMS device according to aspects of the present disclosure. Operationally, such an intensity profile is obtained by acquiring the photodiode output that is produced when a user's gaze is fixed while the system performs a full raster scan. The plot shown is truncated laterally to illustrate the intensity profile of the corneal glint.

Figure 15:
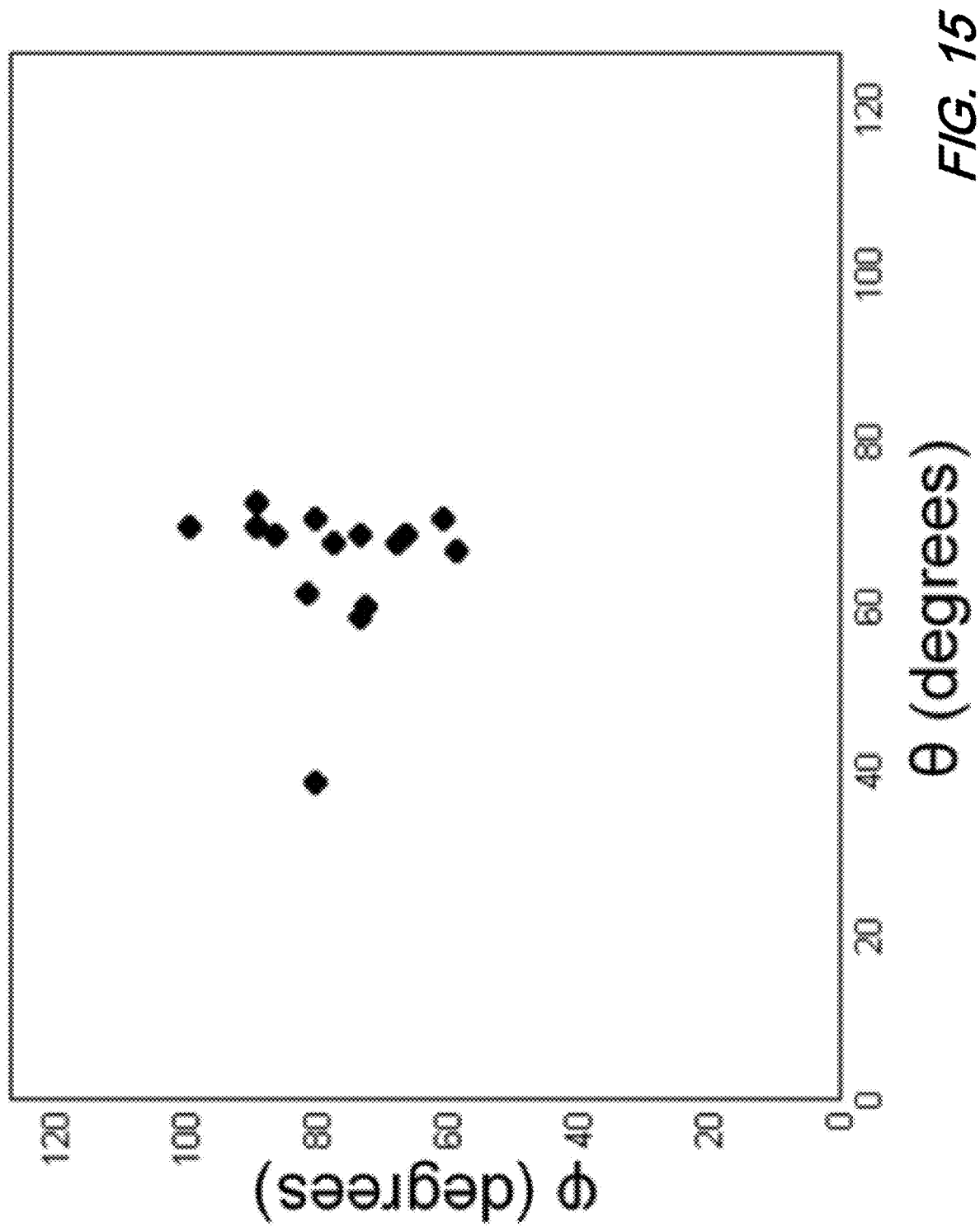
FIG. 15 is a plot showing corneal positions within a frame of reference of prototype glasses according to aspects of the present disclosure.

As may be further appreciated and understood, the corneal position may vary widely among users of different ethnicities. Accordingly, to evaluate such variation, the raster scan procedure was performed on 15 users of varying ethnicities and the location(s) of their global maxima are plotted in FIG. 15—which shows the corneal position(s) within a frame of reference of prototype glasses for the 15 users of varying ethnicity.

To accommodate this variation, the scanning DOE must exhibit sufficient range to cover most people. Once the location of the cornea is identified, the bias position of the scanner is re-centered and the range may be restricted. Tracking is performed over a ~15° range while the auto-adjust procedure may use a 90° range.

Figures 16A, 16B:
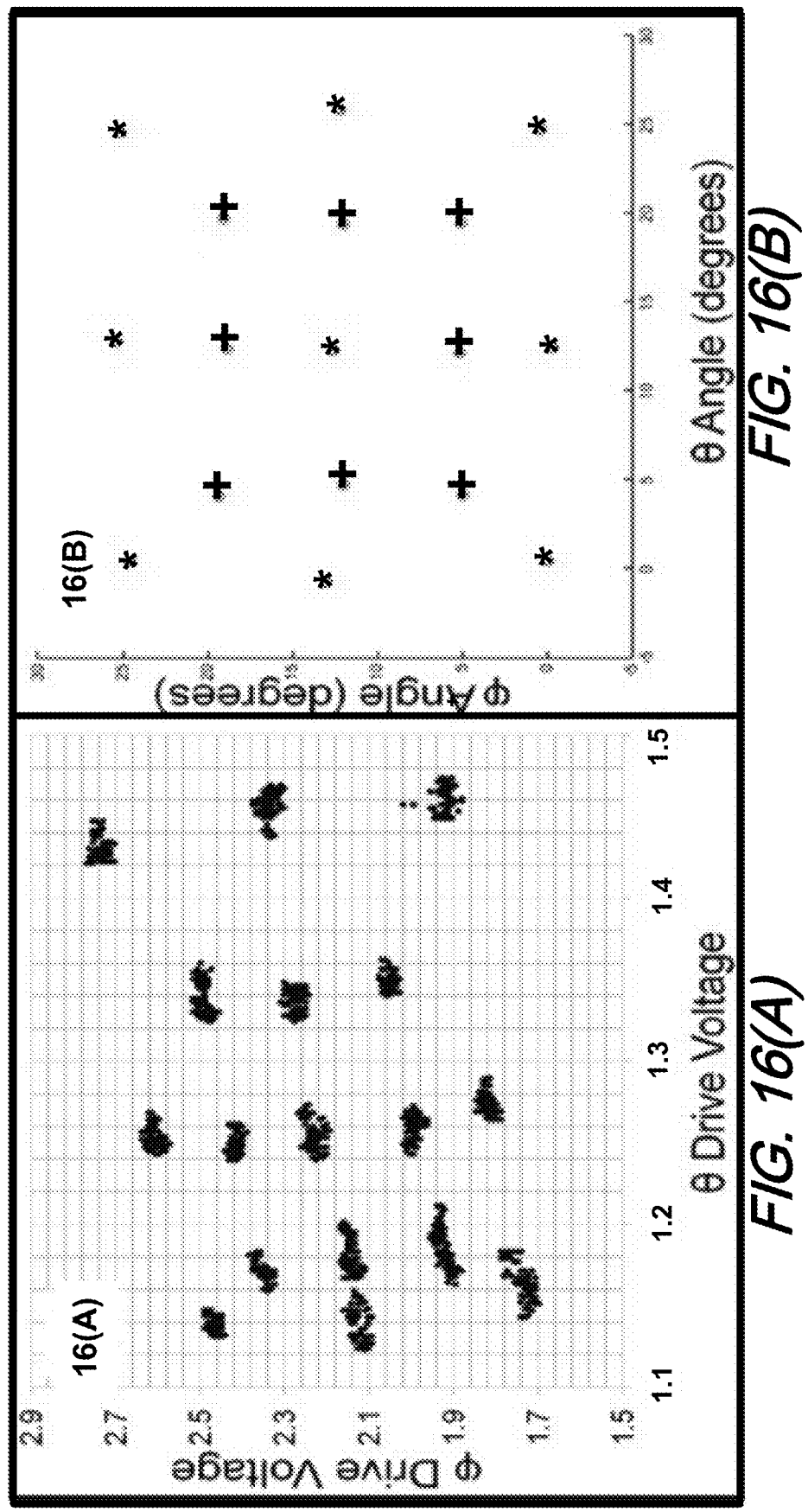
FIG. 16(A), and FIG. 16(B) are plots illustrating.

Scanner position to eye direction is related by a polynomial function. The polynomial varies with module separation and corneal position and must be determined for each individual user. Polynomial regression is performed to calibrate the measured eye position to a screen, as shown graphically in FIG. 16. With reference to that figure, shown in FIG. 16(A) is a plot of $\varphi$ vs. $\theta$ drive voltage data of the MEMS device captured while a user gaze was fixed on multiple points on a screen and FIG. 16(B) shows a plot of a plot of $\varphi$ vs. $\theta$ angle (degrees) data calibration performed on inner (+) points and post-calibration translated points (*).

Finally, it is noted that AR systems will necessarily be required to operate outdoors in bright sunlight. Advantageously, systems constructed according to aspects of the present disclosure have been confirmed to operate in such conditions as the photodiode(s) employed is both shielded with an IR filter and also AC-coupled to its pre-amplifier. As will be appreciated by those skilled in the art, small movements of AR glasses—or other structures—on a user may contribute significant drift(s) to measured eye position(s).

At this point, while we have presented this disclosure using some specific examples, those skilled in the art will recognize that our teachings are not so limited. More specifically, our methods can be further extended in that the structural events can embed more temporal information and consider more sophisticated structures including considering more finegrained temporal information, e.g., the transition time distribution, to enrich mined structural events. Also, we have focussed on transition relations among log patterns. There are other useful relations among logs, such as running in parallel that may be employed. Those relations can be further modeled in the workflow graph using undirected edges. We also believe that the methods according to the present disclosure can achieve more utility in an interactive setting, where system admins can interactively explore the system behaviors with different focusses (parameter settings) on coverage, quality or connectivity.

Accordingly, this disclosure should be only limited by the scope of the claims attached hereto.

The invention claimed is:

1. An eye-tracking method comprising:
   identifying a first location of a cornea of an eye, the cornea having a corneal surface;
   steering a beam of light in two dimensions through the effect of a microelectromechanical system (MEMS) operating at a resonant frequency, over a portion of the eye that comprises the cornea, wherein the MEMS is a 2-degree-of-freedom device having two axes, at least one of which is centered at a bias position that is based on the first location of the cornea and then operated in resonance around that bias position; and
   detecting a first corneal glint reflected from the corneal surface with a non-imaging photodiode configuration.

2. The method of claim 1 wherein the steered beam of light strikes the corneal surface substantially at a glancing angle of 60°.

3. The method of claim 2 wherein the MEMS is a 2-degree-of-freedom device having a fast-axis and a slow-axis, the fast-axis operating at its resonant frequency and the slow-axis operating at ½ the resonant frequency.

4. The method of claim 3 wherein the fast-axis resonant frequency defines the horizontal scan rate of a system employing the method.

5. The method of claim 3 wherein the resonant frequency is substantially 3.3 kHz.

6. The method of claim 1 further comprising:
   adjusting the detected response by a phase adjusted amount.

7. The method of claim 6 further comprising:
   determining the phase adjusted amount.

8. The method of claim 1 wherein the beam of light is steered in a Lissajous pattern.

9. The method of claim 1 wherein the MEMS is a 2-degree-of-freedom device having a fast-axis and a slow-axis, the fast-axis being initially biased to an offset and then operating at its resonant frequency around that offset.

10. The method of claim 1 wherein the MEMS is a 2-degree-of-freedom device having a fast-axis and a slow-axis, the fast-axis being initially biased to a first offset and then operating at its resonant frequency around the first offset, the slow-axis being initially set to a second offset and then operating at ½ its resonant frequency around the second offset.

11. The method of claim 1 further comprising predicting a post-saccade position of the eye.

12. The method of claim 11 wherein the post-saccade position is predicted via operations comprising:
   steering the beam of light to generate a plurality of scans in at least one of the two axes over at least a portion of the eye;
   estimating a plurality of positions of the cornea, wherein each position of the plurality thereof is based on a corneal glint detected during a different scan of the plurality thereof, the plurality of corneal glints including the first corneal glint;
   determining a velocity of the cornea during a saccade based on the plurality of positions; and
   predicting a post-saccade position of the cornea based on the measured velocity.

13. The method of claim 1 further comprising:
   estimating a first position of the cornea along a first dimension of the two dimensions based on the first corneal glint;
   detecting a reflected signal at a non-imaging photodiode, wherein the reflected signal includes a portion of the beam of light reflected from the cornea;
   providing a first output signal that is based on the intensity of the reflected signal;
   generating a peak-hold signal based on the first output signal, wherein the peak-hold signal is characterized by an envelope having at least one inflection point; and
   estimating a second position of the cornea along a second dimension of the two dimensions based on at the least one inflection point.

14. The method of claim 1 further comprising:
   estimating a first position of the cornea along a first dimension of the two dimensions based on the first corneal glint;
   establishing a second position along a second dimension of the two dimensions based on the first corneal glint;
   detecting a reflected signal at a non-imaging photodiode, wherein the reflected signal includes a portion of the beam of light reflected from the cornea;
   steering the beam of light to generate a first scan along the first dimension over at least a portion of the eye, wherein the first scan is generated at a positive position offset from the second position;
   during the first scan, detecting a first peak magnitude of the reflected signal;
   steering the beam of light to generate a second scan along the first dimension over at least a portion of the eye, wherein the second scan is generated at a negative position offset from the second position;
   during the second scan, detecting a second peak magnitude of the reflected signal; and
   incrementing the second position by (i) the positive offset position if the first peak magnitude is greater than the second peak magnitude, or (ii) the negative offset position if the second peak magnitude is greater than the first peak magnitude.

15. The method of claim 1 further comprising:
   driving the MEMS in a first axis of the two axes with a first drive signal that is periodic;
   detecting a second corneal glint reflected from the corneal surface, wherein the first and second corneal glints are detected during a first period of the first drive signal, and wherein the first corneal glint is characterized by a first peak at a first time and the second corneal glint is characterized by a second peak at a second time;

determining a phase offset based on a midpoint between the first time and second time; and controlling the first drive signal based on the phase offset.

16. The method of claim 1 wherein the first location is identified based on a raster scan of the beam of light over the portion.

\* \* \* \* \*